United States Patent
Shibaike et al.

(10) Patent No.: US 12,479,470 B2
(45) Date of Patent: Nov. 25, 2025

(54) CONTROL DEVICE FOR AUTONOMOUS VEHICLE

(71) Applicant: TOYOTA JIDOSHA KABUSHIKI KAISHA, Toyota (JP)

(72) Inventors: Yushi Shibaike, Susono (JP); Go Inoue, Gotemba (JP); Yutaka Aoki, Mishima (JP); Yushi Nagata, Atsugi (JP); Shogo Takahira, Shizuoka-ken (JP); Takahiro Kojo, Gotemba (JP); Yoji Kunihiro, Susono (JP); Hiroki Shizuhata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 18/638,284

(22) Filed: Apr. 17, 2024

(65) Prior Publication Data

US 2024/0409118 A1 Dec. 12, 2024

(30) Foreign Application Priority Data

Jun. 12, 2023 (JP) .................................. 2023-096130

(51) Int. Cl.
*B60W 60/00* (2020.01)
*G06V 20/58* (2022.01)

(52) U.S. Cl.
CPC ........... *B60W 60/001* (2020.02); *G06V 20/58* (2022.01); *B60W 2520/105* (2013.01); *B60W 2520/14* (2013.01)

(58) Field of Classification Search
CPC ....... B60W 2520/105; B60W 2520/14; B60W 2556/50; B60W 50/0097; B60W 60/001; G06V 20/58
See application file for complete search history.

(56) References Cited

U.S. PATENT DOCUMENTS

| | | | |
|---|---|---|---|
| 9,168,868 B2 * | 10/2015 | Stein ..................... | B60Q 9/008 |
| 10,048,699 B2 * | 8/2018 | Inoue .................... | G05D 1/0246 |
| 10,310,508 B2 * | 6/2019 | Kunisa ............... | B60W 60/0057 |
| 10,331,957 B2 * | 6/2019 | Kwant ................. | G06V 10/462 |
| 10,493,987 B2 * | 12/2019 | Ohsugi ........... | B60W 30/18163 |
| 10,845,814 B2 * | 11/2020 | Funayama .......... | B60W 60/001 |
| 10,890,453 B2 * | 1/2021 | Tateishi ................ | G06F 16/29 |
| 10,953,886 B2 * | 3/2021 | Suwabe ............... | B60W 40/06 |

(Continued)

FOREIGN PATENT DOCUMENTS

JP 2019207190 A * 12/2019 ............ G09B 29/10

Primary Examiner — Babar Sarwar
(74) Attorney, Agent, or Firm — Sughrue Mion, PLLC (57) ABSTRACT

An autonomous vehicle control device configured to determine a control input for causing an automatic driving to travel along a target trajectory determined based on an estimated current location of the vehicle by repeatedly performing a predetermined calculation, wherein the controller estimates the current location by correcting the location of the vehicle on the map data based on the relative location of the vehicle on the traveling road, and adjusts a predetermined parameter in the predetermined calculation in accordance with the amount of correction so that the number of repeated calculations is reduced when it is determined that the estimation of the current location is not accurate based on the amount of correction of the location at that time.

4 Claims, 3 Drawing Sheets

(56) References Cited

U.S. PATENT DOCUMENTS

| | | | |
|---|---|---|---|
| 11,092,442 B2* | 8/2021 | Mori | G01S 13/931 |
| 11,156,466 B2* | 10/2021 | Morimoto | G01C 21/3453 |
| 11,300,415 B2* | 4/2022 | Ishida | G06T 7/70 |
| 11,525,682 B2* | 12/2022 | Tanaka | G01C 21/28 |
| 12,104,911 B2* | 10/2024 | Lev | E01C 23/163 |
| 2018/0029592 A1* | 2/2018 | Trombley | B60W 50/12 |
| 2018/0188060 A1* | 7/2018 | Wheeler | G05D 1/0088 |
| 2019/0101399 A1* | 4/2019 | Sunil Kumar | G01C 21/3815 |
| 2021/0081682 A1* | 3/2021 | Kumano | G01C 21/3602 |
| 2023/0315097 A1* | 10/2023 | Son | G06V 20/58 |

\* cited by examiner

FIG. 1

CONTROL DEVICE FOR AUTONOMOUS VEHICLE

CROSS-REFERENCE TO RELATED APPLICATION

This application claims priority to Japanese Patent Application No. 2023-096130 filed on Jun. 12, 2023, incorporated herein by reference in its entirety.

BACKGROUND

1. Technical Field

The present disclosure relates to a control device for a vehicle configured to drive autonomously based on behavior of the vehicle perceived by a sensor etc. and information acquired from the outside.

2. Description of Related Art

Japanese Unexamined Patent Application Publication No. 2019-207190 (JP 2019-207190 A) discloses a localization device intended to stabilize the localization accuracy even when a vehicle travels in a section where the number of lanes changes. The localization device according to JP 2019-207190 A estimates the location of the vehicle based on image data obtained by an in-vehicle camera, data of the state quantity of the vehicle acquired from a sensor etc., Global Positioning System (GPS) data, and map data. The localization device according to JP 2019-207190 A limits the use of the map data when a no-lane-marking section, namely a section where the number of lanes increases or decreases, is perceived compared to when no no-lane-marking section is perceived. That is, the localization device corrects the estimated location of the vehicle by reducing the weighting of the map data. The localization device is configured to assist in autonomous driving based on the estimated location of the vehicle. According to JP 2019-207190 A, such a configuration reduces a decrease in localization accuracy in no-lane-marking sections whose road link data tends not to be accurate. The localization accuracy can thus be stabilized.

SUMMARY

When identifying the location of the vehicle, the location is identified for each of the components in a longitudinal direction (front-rear direction), a lateral direction (right-left direction), and a yaw direction (or azimuth angle). That is, for each of the components, the location of the vehicle estimated based on the state quantity of the vehicle, the map data, etc. and the relative location of the vehicle on an actual travel road actually measured by the camera etc. are acquired at predetermined cycles, and the location of the vehicle on the map data is estimated by matching these acquired locations, as described in the device of JP 2019-207190 A. As described in JP 2019-207190 A, in the case of a vehicle configured to drive autonomously, a mechanism for travel of the vehicle, such as a drive device, is controlled so that the vehicle travels along a target trajectory from the estimated location of the vehicle.

In such autonomous driving, a calculation is periodically repeated based on, for example, the vehicle's movements in each direction acquired as described above, the map data, and the estimated location. In autonomous driving, there are cases where the vehicle is controlled to drive autonomously by repeating such a calculation and controlling the vehicle to travel along a target trajectory in the vehicle's current lane. In some cases, the following constraint is placed on such control from the viewpoint of the safety of the vehicle. A control input to the mechanism for travel of the vehicle is changed so as to quickly return the vehicle to a target location when the actual location of the vehicle deviates from the target trajectory by a predetermined amount or more. An example of such a constraint is an arithmetic expression including a term for adding a calculation when the deviation of the location of the vehicle becomes equal to or greater than a predetermined value.

When the location of the vehicle is estimated as described above, the estimated location of the vehicle may vary significantly due to an error in the map data, the weighting of parameters used to estimate the location being different among the directions, etc. Therefore, although there is a deviation between the actual location of the vehicle and the target location on the target trajectory, the deviation is not immediately reflected in the control input, which causes a further increase in the deviation. In such a case, it may be necessary to significantly correct the estimated location of the vehicle. Therefore, the behavior of the vehicle on the map data based on the correction of the estimated location may be unnatural for actual behavior of the vehicle. As a result, the number of repeated calculations increases, which may lead to an increase in load on a control device. Moreover, if the above constraint is violated due to such a deviation, the calculation may not be correctly performed. Furthermore, the load due to the increased number of repeated calculations may further increase. Alternatively, since the constraint is suddenly violated, the control to quickly return the vehicle to the target trajectory may result in the vehicle behaving in the way that makes an occupant feel uncomfortable.

The present disclosure was made in view of the above technical problems, and it is an object of the present disclosure to provide a control device for an autonomous vehicle that can reduce the calculation load when assisting in travel of the vehicle based on a control input obtained by repeatedly performing a predetermined calculation.

In order to achieve the above object, a control device for an autonomous vehicle according to the present disclosure is a control device including a plurality of behavior detection sensors configured to detect parameters related to behavior of the vehicle, and
  a plurality of external detection sensors configured to detect data related to an object present around a travel road on which the vehicle is traveling, and
  the control device being configured to estimate, based on map data stored in advance, detection data from the behavior detection sensors, and detection data from the external detection sensors, a current location of the vehicle on the map data, obtain a target trajectory based on the estimated current location of the vehicle on the map data, obtain a control input for controlling the vehicle to drive autonomously along the target trajectory by repeatedly performing a predetermined calculation, and perform travel control of the vehicle based on the control input.

The control device includes a controller configured to estimate the current location of the vehicle and perform the travel control for the vehicle to travel along the target trajectory.

The controller is configured to
  estimate the current location of the vehicle on the map data by correcting a location of the vehicle on the map data based on a relative location of the vehicle on the travel road obtained based on the detection data from the external detection sensors, calculate an amount of correction of the location of the vehicle on the map data when estimation of the current location of the vehicle on the map data was performed, determine based on the amount of correction that the estimation of the current location of the vehicle on the map data is accurate, and when determination is made that the estimation of the current location of the vehicle on the map data is not accurate, adjust a predetermined parameter in the predetermined calculation according to the amount of correction in such a manner that the number of repeated calculations is reduced.

In the present disclosure, determining that the estimation of the current location of the vehicle on the map data is accurate may include determining whether the amount of correction is greater than a predetermined amount of correction that allows to determine that the behavior of the vehicle is a possible behavior for the vehicle.

In the present disclosure, the controller may include a predictive model for predicting the behavior of the vehicle up to a predetermined time ahead, a constraint may be placed on the predetermined calculation in the travel control, the constraint being a constraint that, when a deviation between the estimated current location of the vehicle and a predicted location of the vehicle up to the predetermined time ahead based on the predictive model, and a target location on the target trajectory becomes greater than a predetermined deviation, the control input is changed so as to reduce the deviation, the constraint may be configured to change the control input by adding a calculation when the deviation becomes greater than the predetermined deviation in the predetermined calculation, and adjusting the parameter may include relaxing the constraint.

In the present disclosure, the predetermined calculation in the travel control may be configured to be repeatedly performed until a predetermined convergence determination threshold for determining that the control input is an appropriate value is satisfied, and adjusting the parameter may include increasing the convergence determination threshold.

According to the control device for an autonomous vehicle of the present disclosure, the current location of the vehicle is estimated by correcting the location of the vehicle on the map data and the data based on the behavior detection sensors, according to the detection results from the external detection sensors of the vehicle, such as the relative location of the vehicle based on the relative distance between the vehicle and a white lane marking. The target trajectory is then set according to the estimated current location of the vehicle, and the travel control is performed so that the vehicle drives autonomously along the target trajectory. The travel control is performed according to a manipulated variable for a mechanism for travel of the vehicle obtained based on the control input calculated by repeatedly performing the predetermined calculation. During the travel control, it is determined that the estimation of the current location of the vehicle on the map data is accurate, based on the amount of correction when estimation of the current location is performed. When it is determined that the estimation of the current location is not accurate, the predetermined parameter in the predetermined calculation is adjusted according to the amount of correction in such a manner that the number of repeated calculations is reduced. That is, when the estimation of the current location of the vehicle on the map data is not accurate and as a result the number of repeated calculations increases regarding the predetermined calculation, adjustment is made according to the amount of correction in such a manner that the number of calculations is reduced. It is therefore possible to reduce the load on the control device due to an increase in number of repeated calculations.

Determining that the estimation of the current location of the vehicle on the map data is accurate includes determining whether the amount of correction is greater than the predetermined amount of correction that allows to determine that the behavior of the vehicle is a possible behavior for the vehicle. The predetermined parameter is then adjusted by relaxing the constraint placed on the predetermined calculation, namely the constraint for reducing the deviation of the location of the vehicle, or by increasing the predetermined convergence determination threshold that is set in order to calculate an appropriate control input in the predetermined calculation. For example, the following operation is performed when a predetermined condition is satisfied: (i) reduce the possibility of violation of the constraint, (ii) change to a problem that does not include the constraint itself and perform the predetermined calculation, (iii) temporarily switch the control itself to rule-based travel control such as proportional-integral-derivative (PID) control, or (iv) increase the convergence determination threshold. According to the present disclosure, it is therefore possible to reduce an increase in load on an electronic control unit (ECU) due to an increase in number of repeated calculations caused by violation of the constraint or due to an increase in number of repeated calculations caused by a small convergence determination threshold. According to the present disclosure, it is possible to reduce the possibility that a solution of calculation in a predetermined optimal control problem cannot be found. It is also possible to reduce the possibility that a vehicle behavior not intended by an occupant may occur.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described based on an embodiment shown in the drawings. Note that the embodiments described below are merely examples of a case where the present disclosure is embodied, and are not intended to limit the present disclosure.

Figure 1:
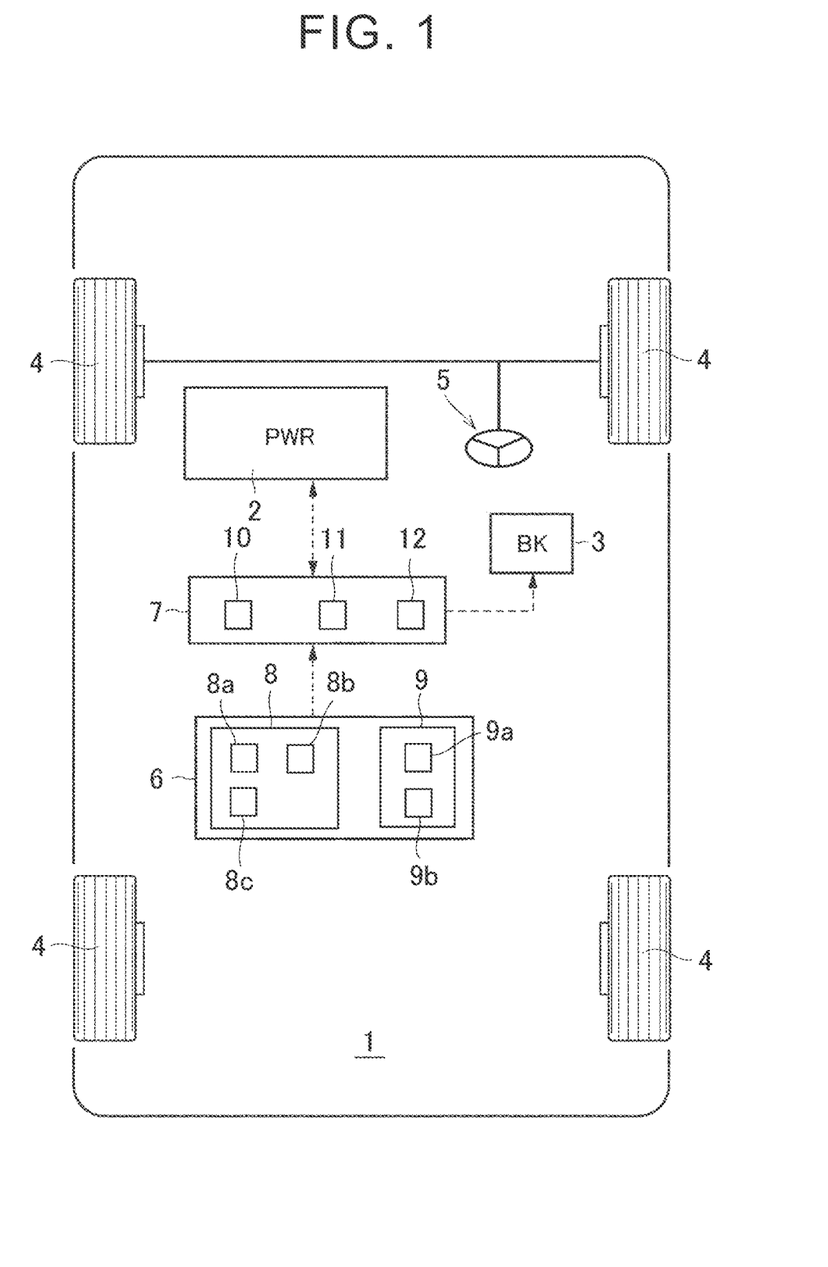
FIG. 1 is a diagram showing an example of a vehicle equipped with a control device for an autonomous vehicle according to an embodiment of the present disclosure.

FIG. 1 is a illustrating an autonomous vehicle (hereinafter, simply referred to as a vehicle) 1 on which a control device according to an embodiment of the present disclosure is mounted. The vehicle 1 according to the embodiment of the present disclosure is a vehicle 1 capable of not only traveling by manual operation but also autonomous driving by controlling a driving force, a braking force, a steering amount, and the like without a driver performing a driving operation. The vehicle 1 is also configured to be capable of recognizing a traveling environment, monitoring a surrounding situation, and the like based on the surrounding information acquired from the outside.

Autonomous driving of the vehicle 1 is executed on the basis of data related to the behavior of the vehicle 1 and data acquired from the outside. For example, the vehicle 1 performs autonomous driving by controlling the vehicle 1 by calculating an operation amount such as a driving force, a braking force, and a steering amount. In the execution of the autonomous driving, the estimated or measured data regarding the location of the vehicle 1 is acquired, and the vehicle 1 can travel along a predetermined target trajectory based on the data regarding the location of the vehicle 1, the map data, and the like. The vehicle 1 according to the embodiment of the present disclosure is configured to accurately estimate the current location of the vehicle 1 serving as a reference when determining the operation amount of each device for changing the behavior of the vehicle 1, and to allow the vehicle 1 to autonomously travel along a target trajectory. It should be noted that the vehicle 1 may be any vehicle capable of traveling by autonomous driving, and may be a conventional vehicle such as an engine-driven vehicle, a hydrogen-powered vehicle, or a hybrid electric vehicle, fuel cell electric vehicle.

An exemplary embodiment of such a vehicle 1 is shown in FIG. 1. The vehicle 1 shown in FIG. 1 includes a driving force source 2, a brake device 3, wheels 4, a steering device 5, a detection unit 6, and a ECU (electronic control device) 7.

The driving force source 2 outputs torque for causing the vehicle 1 to travel. The driving force source 2 may include, for example, any of conventionally known engines (internal combustion engines) and motor generators, or any of them.

The brake device 3 is a device similar to a conventionally known brake device, and is provided, for example, in each of the front and rear wheels 4 of the vehicle 1. An example of the brake device 3 is a friction brake such as a disc brake, a drum brake, or a powder brake, and is configured to generate a braking force in a direction in which the rotation of each wheel 4 is stopped by generating a frictional force by hydraulic pressure, electromagnetic force, or the like.

The steering device 5 adjusts the traveling direction of the vehicle 1 by changing the azimuth angle. The steering device 5 is a device similar to a conventionally known steering device, and is, for example, a rack-and-pinion type electric power steering device provided with an electric assist mechanism.

The detection unit 6 is a device or a device for acquiring various kinds of data and information necessary for controlling the vehicle 1. The detection unit 6 includes an internal sensor 8 for acquiring data related to travel of the vehicle 1 itself, and an external sensor 9 for acquiring information outside the vehicle 1. The internal sensor 8 includes an acceleration sensor 8a for detecting an acceleration of the vehicle 1, a gyro sensor 8b for detecting a change in the attitude and orientation of the vehicle 1, for example, a yaw angle (azimuth angle) as an angular velocity, and a vehicle speed sensor 8c for detecting a vehicle speed from a rotational speed of the wheel 4, and the like. The external sensor 9 includes an in-vehicle camera 9a for acquiring captured images, a LiDAR 9b for acquiring information of an object based on data of reflected light of laser light, and the like. The internal sensor 8 corresponds to the behavior detection sensor in the embodiment of the present disclosure, and the external sensor 9 corresponds to the external detection sensor in the embodiment of the present disclosure.

Figure 2:
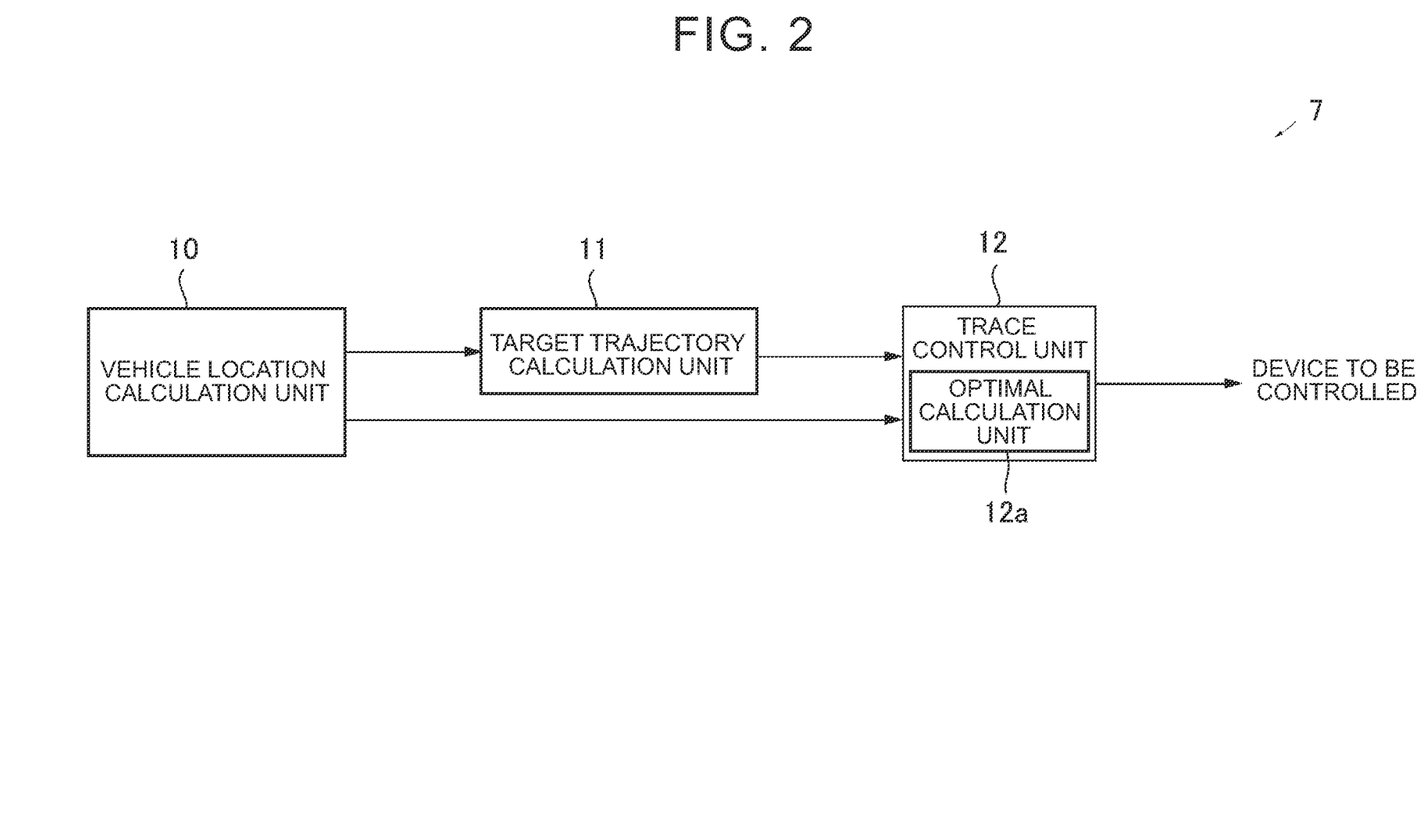
FIG. 2 is a block diagram for explaining a functional configuration of a control device of an autonomous vehicle according to an embodiment of the present disclosure.

ECU 7 corresponds to a controller according to an embodiment of the present disclosure, and is mainly composed of a microcomputer including a processor (CPU), a storage device (RAM or ROM), an input/output device (input/output interface), and the like. ECU 7 is configured to perform an operation according to a predetermined program using various sensors 8 and 9 provided in the vehicle 1, data inputted from the outside, data stored in advance, and the like, and to output a result of the operation as a control command signal. For example, ECU 7 executes a function that matches a predetermined objective by the processor loading the program stored in the recording medium into a working area of the storage unit, executing the program, and performing various kinds of control through the execution of the program. ECU 7 also includes a vehicle location estimation unit 10, a target trajectory calculation unit 11, and a trace control unit 12, as shown in FIG. 2. The vehicle location estimation unit 10, the target trajectory calculation unit 11, and the trace control unit 12 are each configured by a different microcomputer.

The vehicle location estimation unit 10 estimates the current location on the map data of the vehicle 1 based on detection data such as changes in the behavior of the vehicle 1 and external information. The vehicle location estimation unit 10 detects and calculates a state quantity of the vehicle 1, for example, a vehicle speed, an acceleration, a yaw rate, and the like, based on the various sensors 8 and 9 described above. The vehicle location estimation unit 10 obtains the location data on the map data of the vehicle 1 based on the detected state quantity of the vehicle 1, the past estimation result of the location of the vehicle 1, the stored map data, and the like. That is, on the map data, it is estimated which the location of the road on which the vehicle 1 is currently traveling, and how much curvature or yaw rate the curved road is traveling on. Further, the vehicle location estimation unit 10 acquires the actual relative location of the vehicle 1 on the traveling road on the basis of the in-vehicle camera 9a, LiDAR 9b, and the like that are the external sensor 9. For example, the vehicle location estimation unit 10 actually measures a relative location of a lane in which the vehicle 1 is traveling, a location in which the vehicle 1 is traveling in the traveling lane, and the like on the basis of a relative distance between the vehicle 1 and the white line in the traveling lane recognized by the in-vehicle camera 9a, a relative distance between the vehicle 1 and the surrounding vehicle 1, a sign, or the like.

The vehicle location estimation unit 10 is configured to determine a difference between the relative location of the vehicle 1 actually measured in this way and the location of the vehicle 1 on the estimated map data. For example, when the vehicle 1 travels on a curved road, the estimated location of the vehicle 1 travels along the center of the traveling lane on the map data, whereas the measured relative location of the vehicle 1 travels toward the dividing line (lane center line) on the right side of the center of the traveling lane in some cases. In such a case, the vehicle location estimation unit 10 is configured to determine the amount of correction of the location data when estimating the current location on the map data of the vehicle 1 based on the difference between the location data of the vehicle 1 on the estimated map data and the actual location of the vehicle 1.

Further, the vehicle location estimation unit 10 calculates the difference between the estimated location data of the vehicle 1 and the actually measured location with respect to the respective components in the longitudinal direction (front-rear direction), the lateral direction (left-right direction), and the yaw direction of the vehicle 1. The vehicle location estimation unit 10 changes the parameters to be weighted for each component according to the characteristics of the components so that the location of the vehicle 1 can be appropriately estimated. For example, the vehicle location estimation unit 10 estimates the location of the yaw direction of the vehicle 1 by weighting the data based on the detection value of the internal sensor 8 provided in the vehicle 1. That is, the vehicle location estimation unit 10 mainly obtains the yaw angle of the vehicle 1 on the map data based on the behavior of the speed, acceleration, steering amount, and the like of the vehicle 1. Further, the vehicle location estimation unit 10 estimates the location on the map data by weighting the lateral direction of the vehicle 1 based on the data based on the location of the vehicle 1 actually measured by the external sensor 9. In other words, the vehicle location estimation unit 10 is configured to estimate the location on the map data based on the behavior of the vehicle 1 in the lateral direction of the vehicle 1 as in the yaw direction. Further, the vehicle location estimation unit 10 is configured to estimate the location by weighting the data based on the measured relative location of the vehicle 1. The vehicle location estimation unit 10 estimates the current location on the map data of the vehicle 1 by repeatedly executing the above-described calculation at predetermined intervals.

The target trajectory calculation unit 11 calculates a target travel trajectory and a target curvature of the vehicle 1 based on the current location on the map data of the vehicle 1 obtained by the vehicle location estimation unit 10 and the information on the scheduled travel road that is the travel road on which the vehicle 1 is traveling or the travel road to be traveled. The information on the travel road is, for example, stored map data, white lines on the travel road detected by the external sensor 9, signs, and other information on the vehicle 1. Based on the information, the target trajectory calculation unit 11 calculates, on the map data, a target trajectory or the like for the vehicle 1 to travel comfortably and autonomously for the occupant, such as such that the vehicle 1 travels at an appropriate speed in the center of the traveling lane, or such that the vehicle 1 enters at a curvature along the curvature of the curved road. In addition, when the current location on the map data of the vehicle 1 is different from the target trajectory or the target curvature of the current vehicle 1, the target trajectory calculation unit 11 obtains a trajectory such that the vehicle 1 can quickly return to such a target trajectory or curvature. Note that such a white line, a sign, or another vehicle 1 corresponds to an object existing around the vehicle 1 in the embodiment of the present disclosure.

For example, the target trajectory calculation unit 11 is configured to acquire the lane, the division line, the road boundary line information, and the like based on the map data, and calculate the target trajectory based on the target location of the vehicle 1 based on the center line of the traveling lane. At that time, when it is detected that the current location on the map data of the vehicle 1 deviates from the target trajectory, the target trajectory calculation unit 11 obtains a travel trajectory such that the current location on the map data of the vehicle 1 gradually coincides with the location on the target trajectory currently set. That is, the target trajectory is obtained according to parameters such as the target location of the vehicle 1 with respect to the elapsed time from the current location on the map data of the vehicle 1, that is, the deviation amount in the longitudinal direction, the lateral direction, and the yaw direction from the current target trajectory, the magnitude of the control input, the travel time of the vehicle 1, the allowable deviation amount, and the like, and the evaluation function and the constraint condition in the optimum control.

The trace control unit 12 is configured to execute travel control of the vehicle 1, and causes the vehicle 1 to autonomously travel based on data and the like acquired from the vehicle location estimation unit 10 and the target trajectory calculation unit 11. That is, the trace control unit 12 calculates an operation amount and a control input of each device such as the driving force source 2, the brake device 3, and the steering device 5 that control the behavior of the driving force, the braking force, the steering amount, and the like of the vehicle 1. The trace control unit 12 acquires, from the vehicle location estimation unit 10, data about the amount of correction of the location data on the map data based on the actual measurement location on the traveling road of the vehicle 1 in each of the longitudinal direction, the lateral direction, and the yaw direction of the vehicle 1. Further, the trace control unit 12 acquires the target trajectory, curvature, and the like of the vehicle 1 calculated by the target trajectory calculation unit 11. Based on the acquired data, the trace control unit 12 calculates an operation amount and a control input of each device for controlling the behavior of the vehicle 1, which are necessary for the vehicle 1 to travel in accordance with a target trajectory or curvature from the current location on the map data.

For example, when an operation amount related to the steering angle of the vehicle 1 is obtained based on the target trajectory, the trace control unit 12 calculates the target steering angle and calculates the steering torque for obtaining the target steering angle. The target steering angle is calculated by using a target curvature, a target yaw angle, a target lateral deviation, and a control gain determined in advance for the parameters based on the shape of the target trajectory. As an example, the target steering angle is obtained on the basis of a value obtained by multiplying each of a target curvature, a deviation between the target yaw angle and the actual yaw angle, a deviation between the target lateral deviation and the actual lateral deviation, and an integrated value of a deviation between the target lateral deviation and the actual lateral deviation by a control gain. The calculation of the target steering angle is performed every predetermined cycle, and the calculation is transmitted to ECU 7 every time, so that the steering mechanisms are controlled. In this way, each device that controls the behavior of the vehicle 1 is controlled based on the operation amount calculated by the trace control unit 12.

In addition, the trace control unit 12 includes an optimum calculation unit 12a. The optimum calculation unit 12a calculates an optimum control input to the device on the basis of a predetermined optimum control problem, considering characteristics (dynamic characteristics) of the vehicle 1 including performance of the device used for the travel control. In addition, the predetermined optimum control problem is subject to a constraint represented by an inequality determined in order to determine that the optimum control problem is equal to or higher than a predetermined upper limit value or equal to or lower than a lower limit value, which is set based on the characteristics, safety, and the like of the vehicle 1. The optimum calculation unit 12a repeatedly performs computation to obtain an optimum solution on the basis of an estimation function or a constraint condition in a predetermined optimum control problem. The optimum calculation unit 12a repeats the calculation until the solution falls below a predetermined convergence determination value which is a predetermined convergence determination threshold value for determining that the control input is optimum, and determines that the optimum solution can be obtained by the solution becoming smaller than the convergence determination value. The optimum calculation unit 12a is obtained by solving a mathematical expression based on, for example, a deviation in the lateral direction and the yaw direction of the vehicle 1, a constraint condition on the steering angular velocity, a weighting of these parameters, an integrated value at a predetermined time, and the like when the target steering angle of the vehicle 1 is obtained by performing such optimization calculation for each predetermined control period.

In addition, the mathematical expression includes constraints corresponding to characteristics, performance, behavior, and the like of the vehicle 1. Due to such constraints, highly accurate trace control can be performed. For example, the optimum control problem in determining the target steering angle includes a constraint condition on the lateral deviation, and when the lateral deviation exceeds a predetermined deviation, the target steering angle is determined so that the exceeded value becomes the minimum. Specifically, a constraint condition is set by a predetermined state equation based on a current steering angle, a traveling track, a movement of the vehicle 1, and the like, and an inequality based on an amount exceeding the lateral deviation. The optimum calculation unit 12a is configured to obtain control inputs to the driving force source 2, the brake device 3, the steering device 5, and the like by repeating the optimization calculation including the constraints configured as described above for each control cycle. Each deviation in the lateral direction, the yaw direction, and the longitudinal direction of the vehicle 1 is a deviation between a predicted location of the vehicle 1 up to a predetermined time ahead based on a predictive model that predicts the estimated current location of the vehicle 1 and the behavior of the vehicle 1 up to a predetermined time point, and a target location on the target trajectory. That is, the deviation between the current location of the vehicle 1 and the target location and the deviation between the predicted location up to a predetermined time ahead based on the predictive model of the vehicle 1 and the target location at the predicted location are included. Further, the predetermined optimum control problem corresponds to a predetermined calculation in the embodiment of the present disclosure. Further, the optimum control used for such travel control may be a so-called model prediction control configured to determine an optimum operation while predicting the movement of the vehicle 1 by the model.

Figure 3:
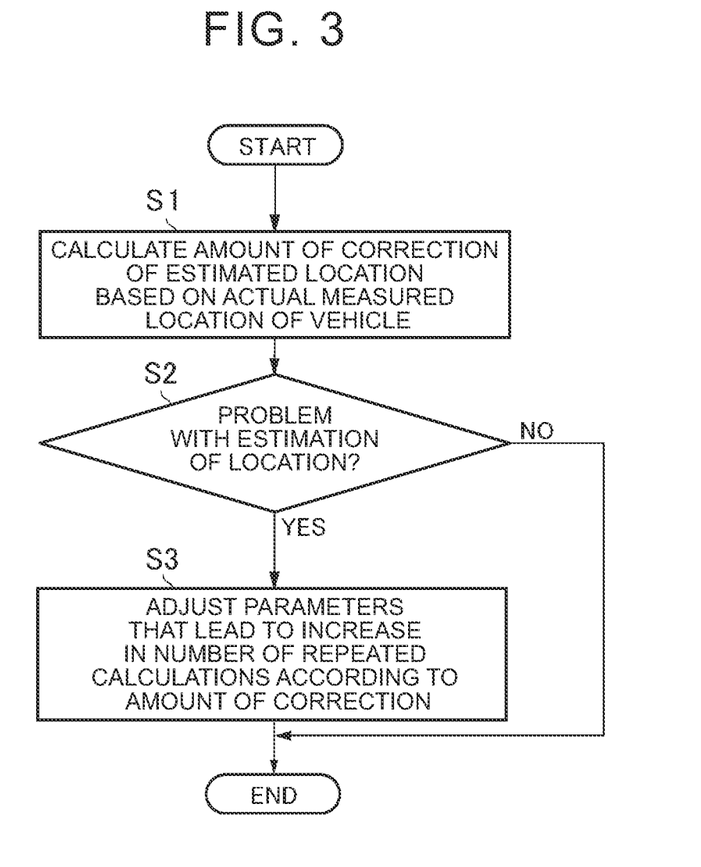
FIG. 3 is a flowchart illustrating an example of control executed by the control device of the autonomous vehicle according to the embodiment of the present disclosure.

Next, an exemplary control executed by ECU 7 of the vehicle 1 configured as described above will be described. As shown in FIG. 3, in S1, an amount of correction is calculated when the location data on the map data of the vehicle 1 is corrected based on the measured location on the traveling road of the vehicle 1. In S1, as described above, when the location data on the map data of the vehicle 1 estimated mainly based on the state quantity of the vehicle 1 is deviated from the relative location of the vehicle 1 measured mainly based on the external sensor 9, the present location on the map data of the vehicle 1 is obtained by correcting the location data in accordance with the relative location. In S1, the amount of corrections for the longitudinal direction, the lateral direction, and the yaw direction of the vehicle 1 at that time are acquired at predetermined cycles.

After the amount of correction of the location data of the vehicle 1 is obtained, the process proceeds to S2, and it is determined whether the estimation of the present location of the vehicle 1 is problematic. In other words, S2 determines that the estimation of the present location of the vehicle is accurate based on the amount of correction of the location data calculated by S1. Specifically, S2 determines, based on the amount of correction calculated in S1, that the behavior of the vehicle 1 in the current cycle with respect to the behavior of the vehicle 1 up to the immediately preceding cycle is correction that occurs as the actual behavior of the vehicle 1. Conversely, in S2, it is determined that the deviation of the location data of the vehicle 1 is a deviation caused by an operation or the like for estimating the location of the vehicle 1. Such determination is performed, for example, based on the fact that the amount of correction in the respective directions calculated in S1 is equal to or larger than a predetermined amount of correction.

When estimating the current location of the vehicle 1, the parameters to be referred to and the weighting to the parameters are different depending on each direction (each component) of the vehicle 1. For example, as described above, the location of the vehicle 1 in the yaw direction is calculated based on the behavior of the speed, acceleration, steering amount, and the like of the vehicle 1, and the location in the lateral direction may be calculated with reference to data based on the relative location of the vehicle 1 measured by the external sensor 9 or the like in addition to the behavior of the vehicle 1. In such a case, when a deviation occurs between the actual location on the traveling road of the vehicle 1 and the location on the map data on the traveling road of the vehicle 1 due to an error, disturbance, or the like in the map data, there is a possibility that a difference occurs in the detection of the deviation in each direction of the vehicle 1.

For example, when entering a curved path, the location of the vehicle 1 on the map data may be detected behind the actual location due to an error, disturbance, or the like as described above. In such a case, the lateral location of the vehicle 1 is inferred by the data based on the behavior of the vehicle 1 and the actual relative location of the vehicle 1, so that such a deviation can be detected relatively early. On the other hand, since the location of the vehicle 1 in the yaw direction is estimated by data based on the behavior of the vehicle 1, there is a possibility that the detection of such a deviation is delayed with respect to the lateral direction of the vehicle 1. That is, since the relative location is not referred to in the yaw direction or the specific gravity of the relative location is small, it is estimated that the yaw angle changes along the travel road on the map data, and a delay in the detection of such a deviation occurs.

The operation amount of the steering angle of the vehicle 1 is obtained by using the deviation between the target location, the estimated location, and the predicted location of the vehicle 1 on the map data in the lateral direction and the yaw direction of the vehicle 1. Therefore, since the deviation in the yaw direction is small, the operation amount of the steering angle is not sufficiently large, and the deviation in the lateral direction of the vehicle 1 may become large. In such a case, there is a possibility that the amount of correction at the time of correcting the location on the map data of the vehicle 1 becomes a large amount of correction that cannot occur as an actual behavior of the vehicle 1. If it is determined that the amount of correction calculated by S1 is larger than the predetermined amount of correction that can occur as the actual behavior of the vehicle 1, it is determined in S2 that the correction is caused by the estimation of the present location of the vehicle 1. As described above, when it is determined in S2 that the amount of correction is not equal to or smaller than the predetermined amount of correction and the correction is not caused by the estimation of the present location of the vehicle 1, the flow chart is temporarily ended without executing the subsequent control.

On the other hand, when it is determined that the correction is caused by the estimation of the location of the vehicle 1 due to the fact that the amount of correction is larger than the predetermined amount of correction or the like, the process proceeds to S3, and the parameter in the optimum control issue is adjusted according to the amount of correction. In S3, when the amount of correction is larger than the predetermined amount of correction in a predetermined optimum control issue, a parameter that leads to an increase in the number of calculations is adjusted. For example, S3 changes a constraint on the quantity of conditions of the vehicles 1 and a convergence determination value in a predetermined optimum control problem.

When the constraint on the state quantity of the vehicle 1 is changed, the constraint set for the deviation in the lateral direction, the yaw direction, the vertical direction, or the like of the vehicle 1 is relaxed in accordance with the amount of correction calculated by S1. For example, when it is determined that the current location of the vehicle 1 in the lateral direction has not been estimated correctly, the constraint is relaxed by increasing a predetermined lateral deviation for determining that the constraint condition is violated. Alternatively, the weight of the evaluation function related to the constraint condition in the optimum control problem is reduced, for example, the weight of the evaluation function related to the slack variable constituting the constraint condition in the optimum control problem is reduced. Alternatively, in the optimum control problem for the lateral deviation, the optimization calculation is performed by changing to the optimum control problem that does not include the constraint condition. Alternatively, instead of using the optimum control, it is configured to perform the travel control by switching to a rule-based travel control such as a conventionally known PID control. It should be noted that the constraint condition in the optimum control problem may be relaxed by a conventionally known minimum time method, constraint relaxation method, or the like. Further, when the constraint condition is relaxed, the constraint condition is relaxed in consideration of a hardware constraint, a software constraint, and the like.

In addition, when the convergence determination value in the predetermined optimum control issue is changed, the convergence determination value is relaxed in accordance with the amount of correction calculated by S1. For example, when it is determined that the current location of the vehicle 1 is not correctly estimated in the lateral direction, the convergence determination value is increased in the optimum control problem for obtaining the target steering angle. In this way, in S3, the predetermined parameter in the optimum control question is changed according to the amount of correction, and thus the flow chart is temporarily ended.

In the control device of the autonomous vehicle 1 configured as described above, the current location on the map data of the vehicle 1 is estimated at every predetermined cycle based on the location data on the map data of the vehicle 1 estimated based on the behavior of the vehicle 1 and the actually measured location on the traveling road of the vehicle 1 measured relatively by recognizing an object or the like around the vehicle 1. A target trajectory to be traveled by the vehicle 1 is obtained based on the current location of the vehicle 1 thus obtained, the map data, the white line of the traveling lane detected by the external sensor 9, the road shape, and the like. In order to cause the vehicle 1 to autonomously travel along the target trajectory, an operation amount of the driving force source 2, the brake device 3, the steering device 5, and the like is obtained by solving a predetermined optimum control problem in consideration of constraints on the vehicle 1, and the vehicle 1 autonomously travels in accordance with the operation amount.

In such a travel control, an amount of correction for estimating the current location of the vehicle 1 is calculated. At this time, it is determined whether or not the current location of the vehicle 1 can be accurately estimated based on the calculated amount of correction. That is, it is determined whether or not the current location of the vehicle 1 on the map data has changed in a manner that cannot occur as an actual behavior of the vehicle 1. When it is determined that such a change has occurred, the constraint condition and the convergence determination value are relaxed in a predetermined optimum control problem. That is, the parameters that lead to an increase in the number of repeated calculations due to such a change are adjusted while taking into consideration the influence on the travel control. For example, in a case where a large amount of correction is obtained, which cannot occur as an actual behavior of the vehicle 1, the number of repeated calculations until an optimum solution is calculated in a predetermined optimum control problem increases accordingly. Further, when the constraint condition is violated by such a change, the number of repeated calculations based on the constraint condition increases. Alternatively, the number of repeated calculations required for the solution to reach the convergence determination value in a given optimal control problem increases.

In the control device according to the embodiment of the present disclosure, when such a change is detected, a change such as expanding the constraint, changing the constraint itself to a problem that does not include the constraint itself, performing an operation, switching the control itself to rule-based control such as PID control, or increasing the convergence determination value is executed. That is, the parameters that lead to an increase in the number of repeated calculations due to such a change are adjusted. Therefore, it is possible to reduce an increase in the load on ECU 7 due to an increase in the number of repeated calculations, or a failure to solve the calculation in a predetermined optimum control problem. Furthermore, it is also possible to reduce the possibility that a behavior of the vehicle 1 not intended by an occupant may occur.

Although the embodiments of the present disclosure have been described above, the present disclosure is not limited to the above-described examples, and may be appropriately modified within the scope of achieving the object of the present disclosure. For example, the constraint condition may be relaxed when it is determined that there the constraint is very likely to be violated based on the amount of correction in the location data of the vehicle 1. That is, the change in the amount of correction is predicted by comparing the change in the amount of correction in the previous cycle with the amount of correction in the current cycle. Then, when it is assumed that the constraint would be violated if the change continues, the travel control may be executed by relaxing the constraint or switching to the travel control without the constraint.

What is claimed is:
1. A control device for an autonomous vehicle, the control device including a plurality of behavior detection sensors configured to detect parameters related to behavior of the vehicle, and a plurality of external detection sensors configured to detect data related to an object present around a travel road on which the vehicle is traveling, the control device being configured to estimate, based on map data stored in advance, detection data from the behavior detection sensors, and detection data from the external detection sensors, a current location of the vehicle on the map data, obtain a target trajectory based on the estimated current location of the vehicle on the map data, obtain a control input for controlling the vehicle to drive autonomously along the target trajectory by repeatedly performing a predetermined calculation, and perform travel control of the vehicle based on the control input, the control device comprising a controller configured to estimate the current location of the vehicle and perform the travel control for the vehicle to travel along the target trajectory, wherein the controller is configured to estimate the current location of the vehicle on the map data by correcting a location of the vehicle on the map data based on a relative location of the vehicle on the travel road obtained based on the detection data from the external detection sensors, calculate an amount of correction of the location of the vehicle on the map data when estimation of the current location of the vehicle on the map data was performed, determine based on the amount of correction that the estimation of the current location of the vehicle on the map data is accurate, and when determination is made that the estimation of the current location of the vehicle on the map data is not accurate, adjust a predetermined parameter in the predetermined calculation according to the amount of correction in such a manner that the number of repeated calculations is reduced.

2. The control device according to claim 1, wherein determining that the estimation of the current location of the vehicle on the map data is accurate includes determining whether the amount of correction is greater than a predetermined amount of correction that allows to determine that the behavior of the vehicle is a possible behavior for the vehicle.

3. The control device according to claim 1, wherein:

the controller includes a predictive model for predicting the behavior of the vehicle up to a predetermined time ahead;

a constraint is placed on the predetermined calculation in the travel control, the constraint being a constraint that, when a deviation between the estimated current location of the vehicle and a predicted location of the vehicle up to the predetermined time ahead based on the predictive model, and a target location on the target trajectory becomes greater than a predetermined deviation, the control input is changed so as to reduce the deviation;

the constraint is configured to change the control input by adding a calculation when the deviation becomes greater than the predetermined deviation in the predetermined calculation; and adjusting the parameter includes relaxing the constraint.

4. The control device according to claim 1, wherein:

the predetermined calculation in the travel control is configured to be repeatedly performed until a predetermined convergence determination threshold for determining that the control input is an appropriate value is satisfied; and adjusting the parameter includes increasing the convergence determination threshold.

* * * * *